UNITED STATES PATENT OFFICE.

N. T. WINANS, THEODORE HYATT, AND THADDEUS HYATT, OF NEW YORK, N. Y.

IMPROVEMENT IN THE COMPOSITION OF MATTER FOR THE MANUFACTURE OF FRICTION-MATCHES.

Specification forming part of Letters Patent No. 2,402, dated December 23, 1841.

*To all whom it may concern:*

Be it known that we, NORMAN T. WINANS, THEODORE HYATT, and THADDEUS HYATT, of the city, county, and State of New York, have invented certain new and useful Improvements in the Manufacture of an Ignitable Compound for Making Friction-Matches; and we do hereby declare that the following is a full and exact description thereof.

Friction-matches as ordinarily made consist of phosphorus, gum or glue, and an earthy material, either alone or in combination with inflammable substances other than phosphorus. Ordinary gums or glue, when exposed to dampness, lose their stiff and unyielding qualities and become soft, and in the course of time spoil. Friction-matches, therefore, made with these adhesive materials have had earthy or other matter added to them as absorbents in order to give strength and body to the inflammable compound.

Our improvement consists in making an ignitable compound to inflame by friction without the use of earths or other absorbent materials. In order to effect the same results which absorbents produce in regard to hygrometric changes of the atmosphere we use a damp-proof glue or gum in place of the ordinary glue or gum usually employed, and by this mode we obtain more favorable results in regard to atmospheric changes than can possibly be effected by the union of absorbents with ordinary adhesive materials.

The following is our mode of making the ignitible composition: We take of best refined glue one pound, and boil it in four pounds of strong alcohol until it is dissolved. We then add to it one pound of shellac in powder, and continue the heat, stirring the mass occasionally until a union is formed. We temper the mass to the proper consistency by either evaporating from or adding alcohol or water thereto. To this solution we add one pound of phosphorus, keeping it sufficiently hot to melt the same, and triturate until the melted phosphorus is thoroughly spread through. This compound we continue rubbing until nearly cold. We then add three pounds of the nitrate of lead in powders, and rub the whole until thoroughly incorporated. After which any coloring-matter may be added as fancy may suggest. These proportions may also be slightly varied without materially affecting the result. Earths or other material can also be added, if desired, but as absorbents they are entirely unnecessary.

When we use gum instead of glue we take of prime gum-arabic five pounds, and dissolve it in four pounds of boiling water. To this we add twenty-four ounces of phosphorus, and while melting we triturate it until thoroughly spread throughout the gum. This mixture we continue rubbing until quite cold. We then take four pounds of shellac and dissolve it in eight pounds of strong alcohol by the agency of heat. As soon as cold we add this to the former mass and rub the whole well together. To this we add three pounds of chlorate of potassa, and triturate until the whole is well incorporated. The compound is then fit for use.

The mode of rendering glue water-proof, as described above, is one which has been known in the arts for more than ten years, and we believe longer; but we are firmly persuaded that it has never been used to cause the effect which we produce by making it an element in the ignitable compound of a friction-match.

We are able to make glue or gum damp-proof by another mode, which we have invented, and for which we intend applying for a patent. This mode consists in dissolving glue or gum in a solution of borax or other alkaline water and adding shellac to it, which also dissolves in the alkaline menstruem, and may then be incorporated with the glue by rubbing the whole together. As glue rendered damp-proof by this last mode is cheaper and dissolves readily in boiling water, it is more desirable than the other in the arts generally, and we prefer it as the adhesive principle in our ignitible compound, except where we use some inflammable salt in connection with phosphorus, the acid of which salt has a stronger affinity for the base of the borax or other salt of an alkali than it has for its own base, and thus destroys the chemical solution and union of the parts.

What we claim, therefore, is not glue rendered damp-proof by being chemically united with shellac, as this is an old discovery in the arts; nor do we claim the union of glue and phosphorus, either alone or with other inflammables, as this has also been known and used for years; but

We do claim—

Phosphorus, either alone or in connection with other inflammables, in combination with glue or gum rendered damp-proof by being chemically united with shellac, for the uses and purposes herein fully set forth.

NORMAN T. WINANS.
   THEODORE HYATT.
   THADDEUS HYATT.

Witnesses as to the signature of Norman T. Winans:
 ISAAC C. WINANS,
 JOHN MCCORE.

Witnesses as to the signature of Theodore Hyatt:
 J. EDMUND W. CAMPBELL,
 JOHN MCCORE.

Witnesses as to the signature of Thaddeus Hyatt:
 ISAAC C. WINANS,
 JOHN MCCORE.